US007546147B2

(12) United States Patent
Jitsuishi et al.

(10) Patent No.: US 7,546,147 B2
(45) Date of Patent: Jun. 9, 2009

(54) ELECTRONIC APPARATUS CAPABLE OF EXECUTING WIRELESS COMMUNICATION, AND PROGRAM APPLIED TO THE APPARATUS

(75) Inventors: Yasuyo Jitsuishi, Ome (JP); Takashi Kusubashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 183 days.

(21) Appl. No.: 10/937,479

(22) Filed: Sep. 9, 2004

(65) Prior Publication Data

US 2005/0070335 A1    Mar. 31, 2005

(30) Foreign Application Priority Data

Sep. 29, 2003    (JP) .............................. 2003-338593

(51) Int. Cl.
*H04M 1/00* (2006.01)
(52) U.S. Cl. .................................................. 455/566
(58) Field of Classification Search ................ 455/455, 455/456.3, 457
See application file for complete search history.

(56) References Cited

U.S. PATENT DOCUMENTS 6,631,271 B1 * 10/2003 Logan ..................... 455/456.1
6,640,098 B1 * 10/2003 Roundtree ............... 455/414.2
6,907,227 B2 * 6/2005 Fujioka ..................... 455/41.3
6,978,148 B2 * 12/2005 Adachi et al. .............. 455/517
7,010,268 B2 * 3/2006 Chen ......................... 455/41.2
7,127,451 B1 * 10/2006 Kimura ......................... 707/3
2002/0131445 A1   9/2002 Skubic et al.
2003/0165129 A1 * 9/2003 Sharma et al. ............. 370/338

FOREIGN PATENT DOCUMENTS

| EP | 1 278 312 | 1/2003 |
|---|---|---|
| JP | 2002-281041 | 9/2002 |
| WO | WO 02/28022 | 4/2002 |

* cited by examiner

*Primary Examiner*—Vincent P Harper
*Assistant Examiner*—Gary Au
(74) *Attorney, Agent, or Firm*—Knobbe, Martens, Olson & Bear, LLP

(57) ABSTRACT

Before issuing a device name acquisition request, a wireless communication control utility displays device addresses acquired by responses to a station discovery request, as a list of the addresses of connectable devices on an LCD, and presents the list to the user, who is then able to select a device. A user who recognizes the correspondence between device addresses and devices can quickly and easily select a device.

20 Claims, 8 Drawing Sheets

ELECTRONIC APPARATUS CAPABLE OF EXECUTING WIRELESS COMMUNICATION, AND PROGRAM APPLIED TO THE APPARATUS

This application is based upon and claims the benefit of priority from Japanese Patent Application No. 2003-338593, filed Sep. 29, 2003, the entirety of which is hereby incorporated herein by reference.

BACKGROUND OF THE INVENTION

1. Field of the Invention

The present invention relates to an electronic apparatus capable of executing wireless communication and a program applied to the apparatus and, more particularly, to an electronic apparatus having a station discovery function of discovering a new apparatus capable of wireless communication and a program applied to the apparatus.

2. Description of the Related Art

There have recently been developed new wireless communication systems for wirelessly connecting electronic apparatuses. One of wireless communication systems of this type is Bluetooth®, which is a short-range wireless communication standard targeting connection between various electronic apparatuses including a computer.

Bluetooth® defines a station discovery function. The station discovery function is to discover a new device capable of wireless communication. The station discovery function can discover another electronic apparatus, which exists within the wireless communicable area of a given electronic apparatus.

The station discovery function is implemented by the following mechanism. A given electronic apparatus transmits a station discovery request (Inquiry) by using a radio signal, and another electronic apparatus which has received the station discovery request responds to it. At this time, the station discovery function includes the following processes. First, a station discovery request (Inquiry) is issued to acquire the address of an apparatus, which responds to the request. Next, a device name acquisition request (Name discovery) is issued to acquire the name (Device Names) of the respondent apparatus.

To start communication in a wireless network according to a wireless transmission method such as Bluetooth®, communicable apparatuses are searched for by the station discovery function, and a communication partner apparatus are selected from the searched apparatuses. In a conventional device search, the device names of searched apparatuses are acquired and presented (displayed in a selectable way) as connectable apparatuses to the user as disclosed in Japanese Patent Application KOKAI Publication No. 2002 281041. However, the conventional method takes a long time until searched apparatuses are presented as connectable ones to the user after the start of device search, resulting in poor operability.

As described above, the conventional method suffers poor operability because a long time is taken until searched apparatuses are displayed as connectable ones in a selectable way in the device search preceding the start of the communication.

SUMMARY OF THE INVENTION

According to an embodiment of the invention, an electronic apparatus capable of executing wireless communication comprises a display unit, a communication unit configured to transmit a station discovery request to peripheral devices capable of data transmission by wireless communication, a processing unit configured to list and display addresses of devices which respond to the station discovery request on the display unit so as to be able to select each device as a connection partner, and a communication unit configured to transmit, in accordance with an address of a device selected from the list display, a connection request to a device having the address.

In an embodiment, an electronic apparatus capable of executing wireless communication comprises a display unit, a communication unit configured to transmit a station discovery request to devices capable of data transmission by wireless communication, and a processing unit configured to list and display on the display unit, a list of device addresses of the devices which respond to the station discovery request before obtaining names of the devices so as to be able to select at least one device as a connection partner from the list of device addresses, wherein the communication unit is further configured to transmit a connection request to the selected device.

In another embodiment, an article of manufacture comprises a computer usable medium having computer readable program code embodied therein. The computer readable program code comprises a communication processing function configured to transmit a station discovery request to devices capable of data transmission by wireless communication, and configured to acquire device addresses of devices, which respond to the station discovery request. The computer readable program code also comprises a display processing function configured to list and display a list of the device addresses on a display device before obtaining names of the devices so as to be able to select at least one device as a connection partner from the list of device addresses.

In yet another embodiment, a method for executing wireless communication comprises transmitting a station discovery request to devices capable of data transmission by wireless communication, listing and displaying on a display unit, a list of device addresses of the devices which respond to the station discovery request before obtaining names of the devices, selecting a connection partner by selecting at least one of the device addresses from the list of device addresses, and transmitting a connection request to the selected device.

In a further embodiment, an electronic apparatus capable of executing wireless communication comprises a means for transmitting a station discovery request to devices capable of data transmission by wireless communication, a means for listing and displaying a list of device addresses of the devices which respond to the station discovery request before obtaining names of the devices, a means for selecting one of the device addresses from the list of device addresses so as to select at least one device as a connection partner, and a means for transmitting a connection request to the selected device.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The accompanying drawings, which are incorporated in and constitute a part of the specification, illustrate preferred embodiments of the invention, and together with the general description given above and the detailed description of the preferred embodiments given below, serve to explain the principles of the invention.

DETAILED DESCRIPTION OF THE PREFERRED EMBODIMENT

An embodiment of the invention will be described below with reference to the accompanying drawings.

Figure 1:
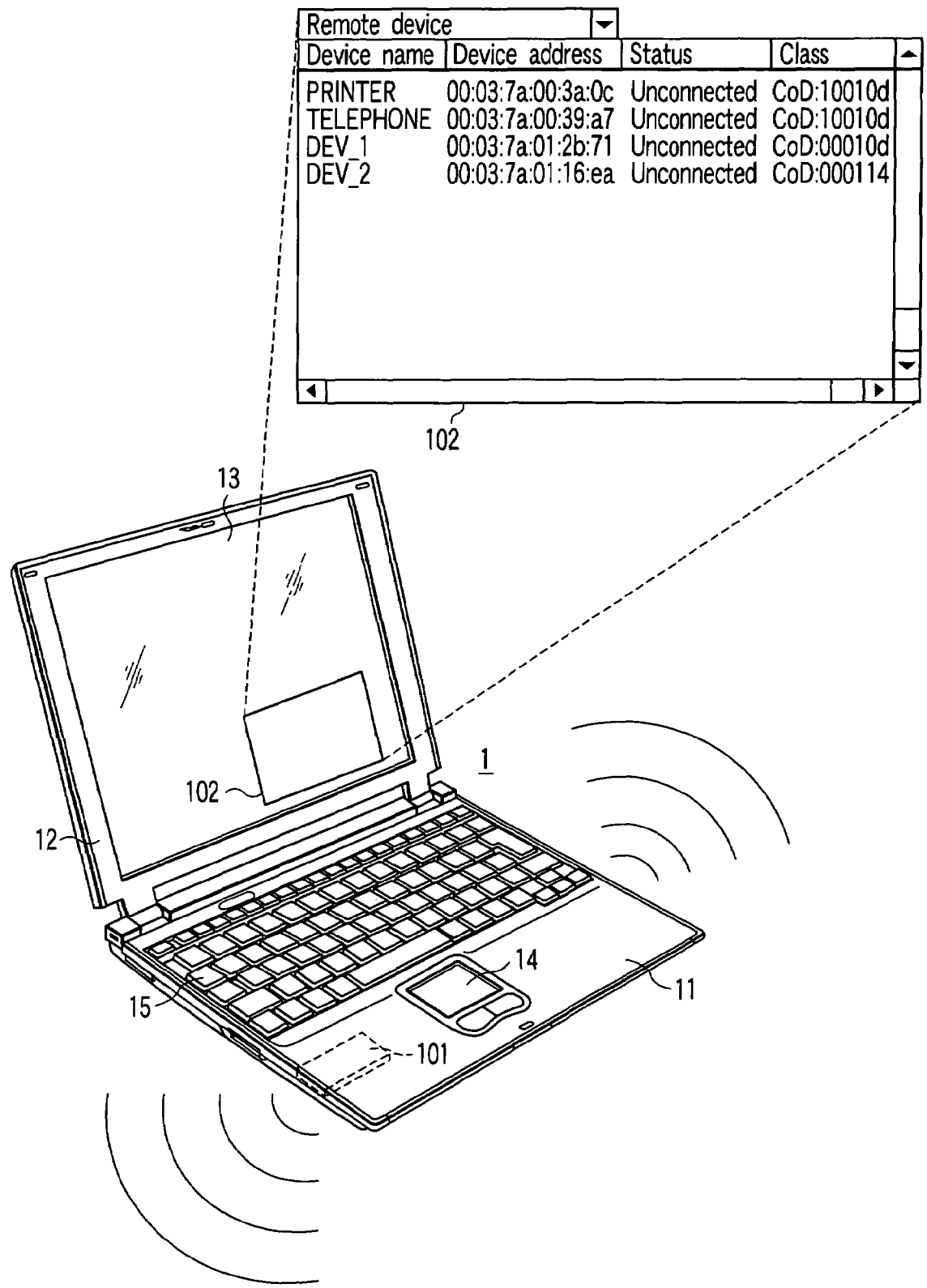
FIG. 1 is a view showing the outer appearance of a computer according to an embodiment of the invention.

FIG. 1 shows an example of the configuration of an apparatus according to an embodiment of the invention. This apparatus is an information processing apparatus having a wireless communication function. In an embodiment, the apparatus is implemented as a notebook-type portable personal computer.

FIG. 1 is a front view when the display unit of a computer 1 is open. The computer 1 comprises a computer main body 11 and display unit 12. The display unit 12 is attached to the computer main body 11 pivotally between an open position and a closed position. The display unit 12 incorporates an LCD (liquid crystal display) 13 which forms the display panel. The LCD 13 is located at almost the center of the display unit 12.

The display screen of the LCD 13 displays a list (to be referred to as a remote device list) 102 of devices discovered by the station discovery function. The remote device list 102 is a GUI (graphical user interface) which presents, to the user, devices wirelessly communicable at the current place of use of the computer 1 so as to be able to select each device. The remote device list 102 is used to prompt the user to select a communication (connection) partner. In the embodiment shown in FIG. 1, the device names, device addresses, and connection statuses of devices searched for by the device search are listed and displayed in correspondence with each other for the respective devices. The user can select a device to be connected from the displayed list. In the embodiment, the addresses (device addresses) of devices which respond to a station discovery request (Inquiry) are instantaneously displayed as the remote device list 102 before a device name acquisition request [Name discovery] is issued, as illustrated in a list window 401 in FIG. 4. The user can select a device to be connected on the basis of its device address by manipulating a pointing device 14 on the remote device list 102 of device addresses. A user who recognizes the address of a device to be connected can select the device in an early stage before a device name acquisition request (Name discovery) is transmitted. In this case, a connection request can also be issued to a device having the selected device address without transmitting the device name acquisition request and executing the name acquisition process accompanying the request.

The computer main body 11 has a low-profile box-like housing equipped with a keyboard 15 in addition to the pointing device 14 on the upper surface. The computer main body 11 incorporates a wireless communication device 101.

The wireless communication device 101 executes wireless communication. The wireless communication device 101 is so designed as to execute wireless communication, which is defined by a short-range wireless communication standard such as Bluetooth®. Wireless communication operation of the wireless communication device 101 is controlled by a wireless communication control utility 201, as illustrated in FIG. 2 The wireless communication control utility 201 is a program running on the computer 1.

The wireless communication control utility comprises, for example, the station discovery function (a station discovery request, a process function accompanying the request, a device name acquisition request, and a process function accompanying the request), a function of displaying the remote device list 102 on the display screen of the LCD 13, a device selection function accompanying selection operation on the remote device list 102, a connection request to a selected device, and a process function accompanying the request.

Figure 2:
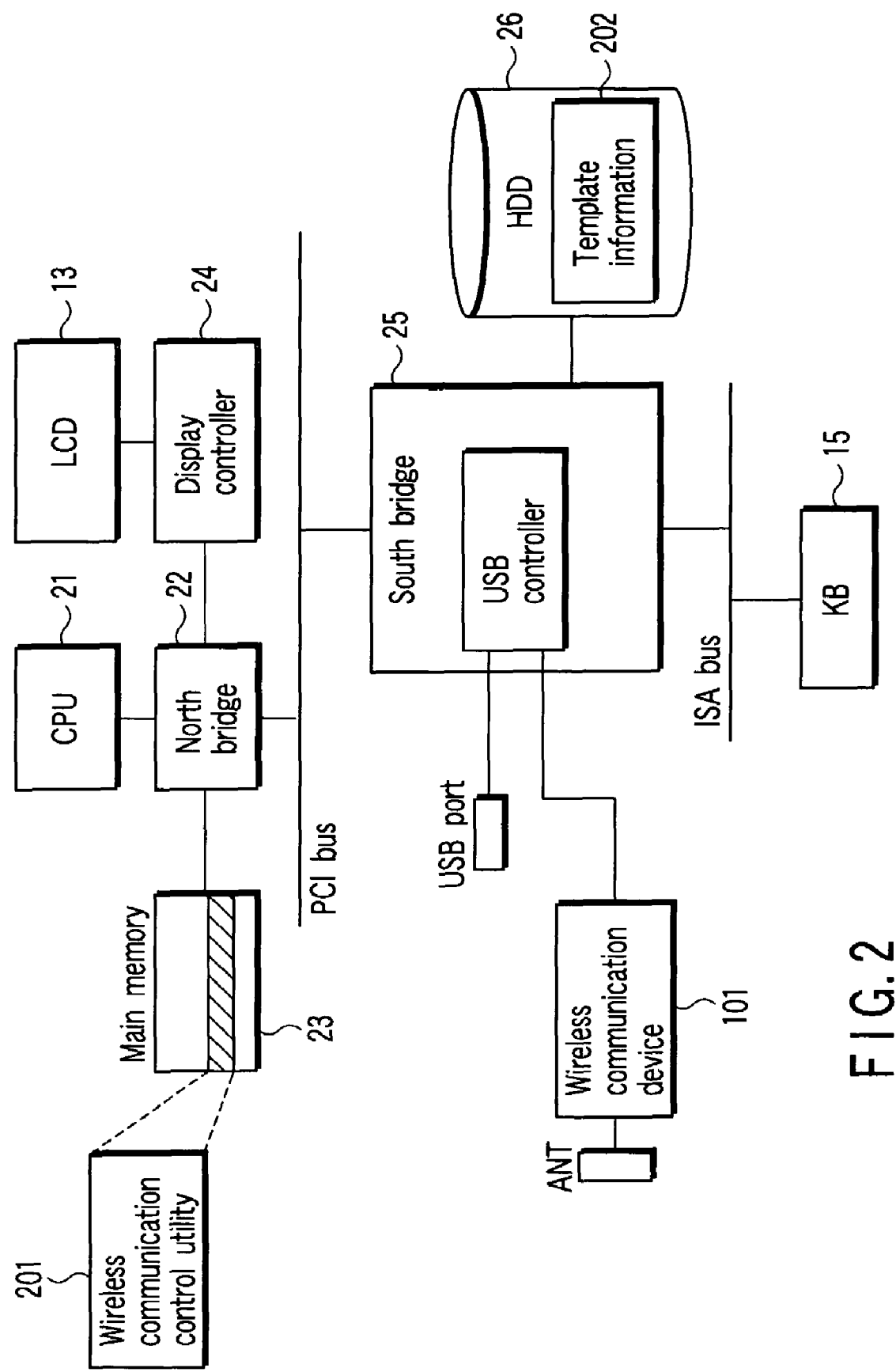
FIG. 2 is a block diagram showing the configuration of the computer according to an embodiment of the invention.

FIG. 2 shows the system configuration of the computer 1. As shown in FIG. 2, the computer 1 incorporates a CPU 21, a north bridge 22, a main memory 23, a display controller 24, a south bridge 25, a hard disk drive (HDD) 26, and the wireless communication device 101.

The CPU 21 is a processor adopted to control the operation of the computer 1. The CPU 21 executes an operating system (OS) and various application programs, which are loaded from the hard disk drive (HDD) 26 into the main memory 23. The wireless communication control utility 201 is also loaded from the hard disk drive (HDD) 26 into the main memory 23, and executed by the CPU 21.

The hard disk drive (HDD) 26 stores, as information associated with processes of the embodiment, template information 202 of the remote device list 102 managed by the wireless communication control utility 201, an acquired name list in which device names acquired by a device name acquisition request (Name discovery) are stored in correspondence with device addresses, and a registered name list in which arbitrary names registered by the user are stored in correspondence with device addresses. The template information 202 comprises a template in which device addresses and device names are set in advance in correspondence with each other.

The north bridge 22 is a bridge device which bidirectionally connects the local bus and PCI bus of the CPU 21. The display controller 24 controls the LCD 13 used as the display monitor of the computer. The south bridge 25 is a bridge device which bidirectionally connects the PCI bus and ISA bus. The ISA bus is also connected to the above mentioned keyboard (KB) and the like.

The south bridge 25 incorporates a USB (universal serial bus) controller. The wireless communication device 101 is connected to the USB controller. The wireless communication device 101 executes transmission/reception of radio signals via an antenna (ANT) in accordance with a command input from the CPU 21 via the USB controller.

The wireless communication device 101 includes an RF unit and a baseband unit. The RF unit performs up-conversion from an intermediate frequency to an RF frequency, and down-conversion from an RF frequency to an intermediate frequency. The baseband unit modulates transmission data and demodulates reception data in accordance with a predetermined wireless communication protocol.

Figure 3:
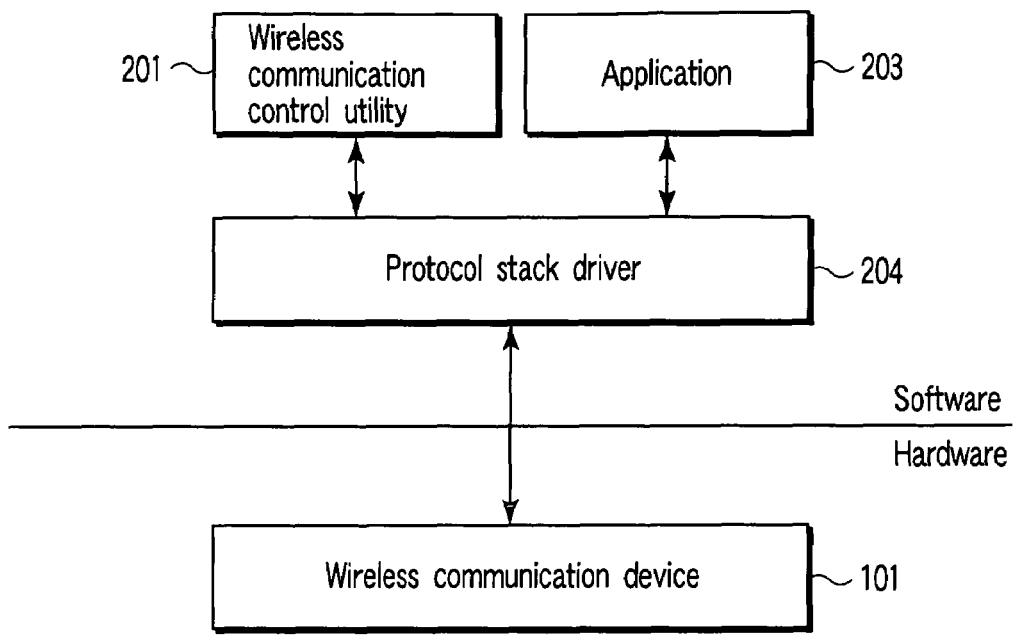
FIG. 3 is a block diagram showing a software configuration for controlling the wireless communication device of the computer according to an embodiment of the invention.

A software configuration for controlling wireless communication operation of the wireless communication device 101 will be explained with reference to FIG. 3.

Wireless communication software is comprises the wireless communication control utility 201, a protocol stack driver 204, and an application program 203.

The protocol stack driver 204 is a program corresponding to a Bluetooth® protocol stack. The wireless communication control utility 201 controls setting of the operation mode of the wireless communication device 101 via the protocol stack driver 204. The application program 203 is a program to perform data communication, and the like, between the computer 1 and another apparatus by utilizing the wireless communication function of the wireless communication device 101. The application program 203 exchanges data with the wireless communication device 101 via the protocol stack driver 204.

Figure 4:
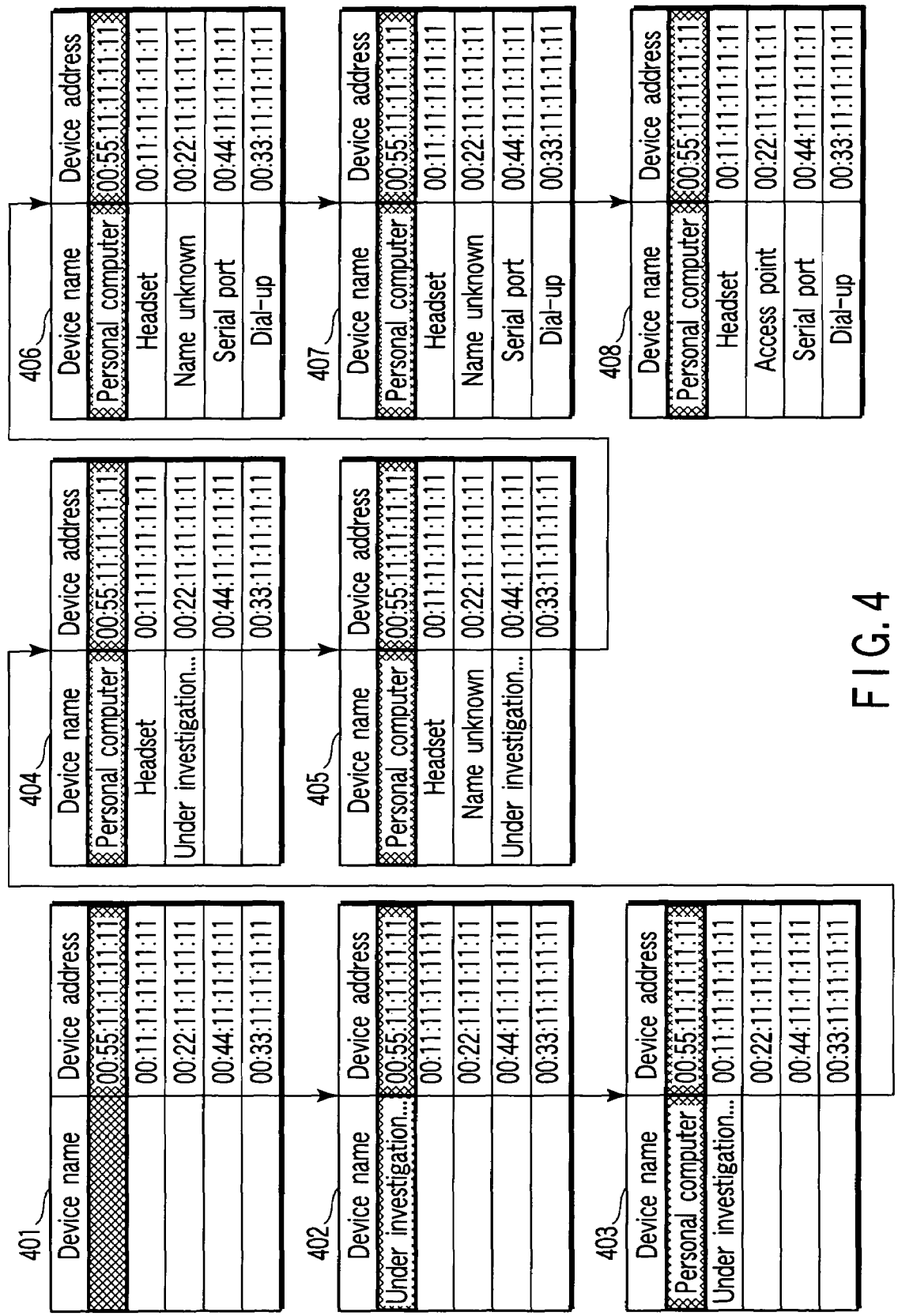
FIG. 4 is a view showing an example of state transition of a remote device list according to an embodiment of the invention.
Figure 6:
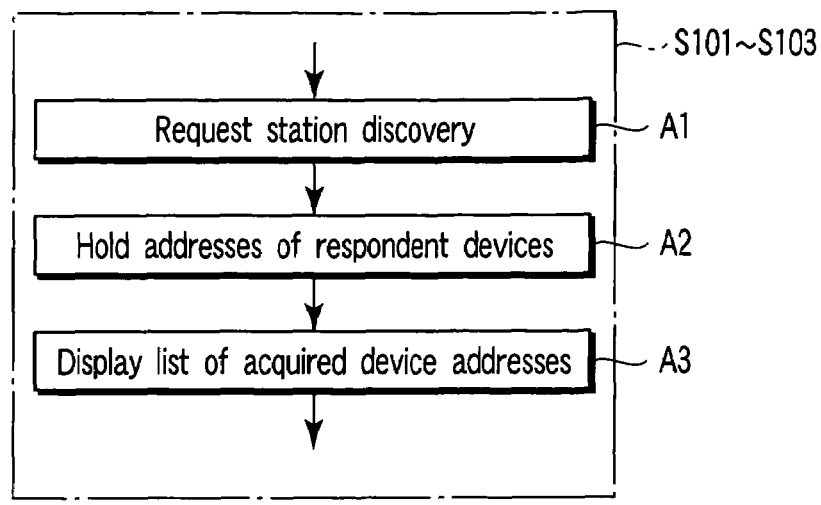
FIG. 6 is a flowchart showing processing procedures according to an embodiment of the invention.

FIG. 4 shows an example of state transition of the remote device list 102. In an embodiment, when the addresses of the devices, which respond to a station discovery request (Inquiry) are acquired, the list window 401 of the acquired device addresses is displayed so that each device can be selected. Each device can be selected from any one of list windows 401 to 408 shown in FIG. 4.

Process operation of an embodiment of the invention will be explained with reference to flowcharts shown in FIGS. 5 to 10. A process according to each flowchart is implemented when the user performs predetermined operation for device selection, and the CPU 21 executes the wireless communication control utility 201.

Processes shown in FIGS. 5 to 10 start by the user performing a predetermined device selection operation.

Figure 5:
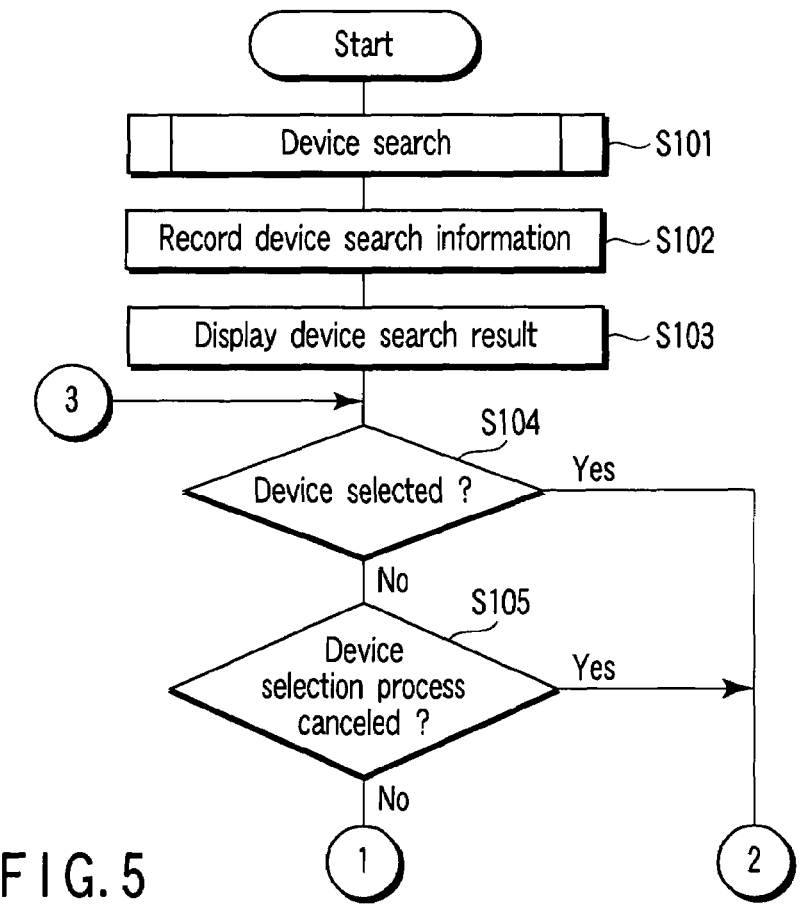
FIG. 5 is a flowchart showing processing procedures according to an embodiment of the invention.

In the device selection, the device search is done (step S101 of FIG. 5). Respondent device information acquired from the device search is stored (step S102 of FIG. 5). The remote device list 102 is generated on the basis of the stored information, and displayed on the display screen of the LCD 13 (step S103 of FIG. 5).

The device search process will be further explained. A station discovery request (Inquiry) is issued to devices, which exist near the computer 1 and can wirelessly communicate with the computer 1 (step A1 of FIG. 6). The device addresses of devices, which respond to the station discovery request are acquired and held (step A2 of FIG. 6). The remote device list 102 of the acquired device addresses is generated by using the template 202, and displayed on the display screen of the LCD 13 (step A3 of FIG. 6). FIG. 4 shows, as the list window 401, an example of the remote device list 102 displayed on the LCD 13 upon the process of the station discovery request.

If the user manipulates the pointing device 14 on the remote device list 102 and selects, for example, the device address of a device to be communicated with (YES in step S104 of FIG. 5), the device search process ends. The next process, for example, a connection request process, is performed for a device having the selected device address. A connection request and a process accompanying the request by the wireless communication control utility 201 are executed in accordance with the Bluetooth® protocol, and the process will not be mentioned.

In this manner, a device can be selected by using a device address acquired by a station discovery request (Inquiry). A user who recognizes the correspondence between device addresses and devices can quickly and smoothly select a communication partner device before a device name acquisition request (Name discovery), and accompanying name acquisition and display.

If an operation input such as "return" or "cancel" for canceling device selection is done instead of device selection operation (NO in step S104 of FIG. 5 and YES in step S105) while the remote device list 102 of the acquired device addresses is displayed on the display screen of the LCD 13, the current device selection process ends.

Figure 7:
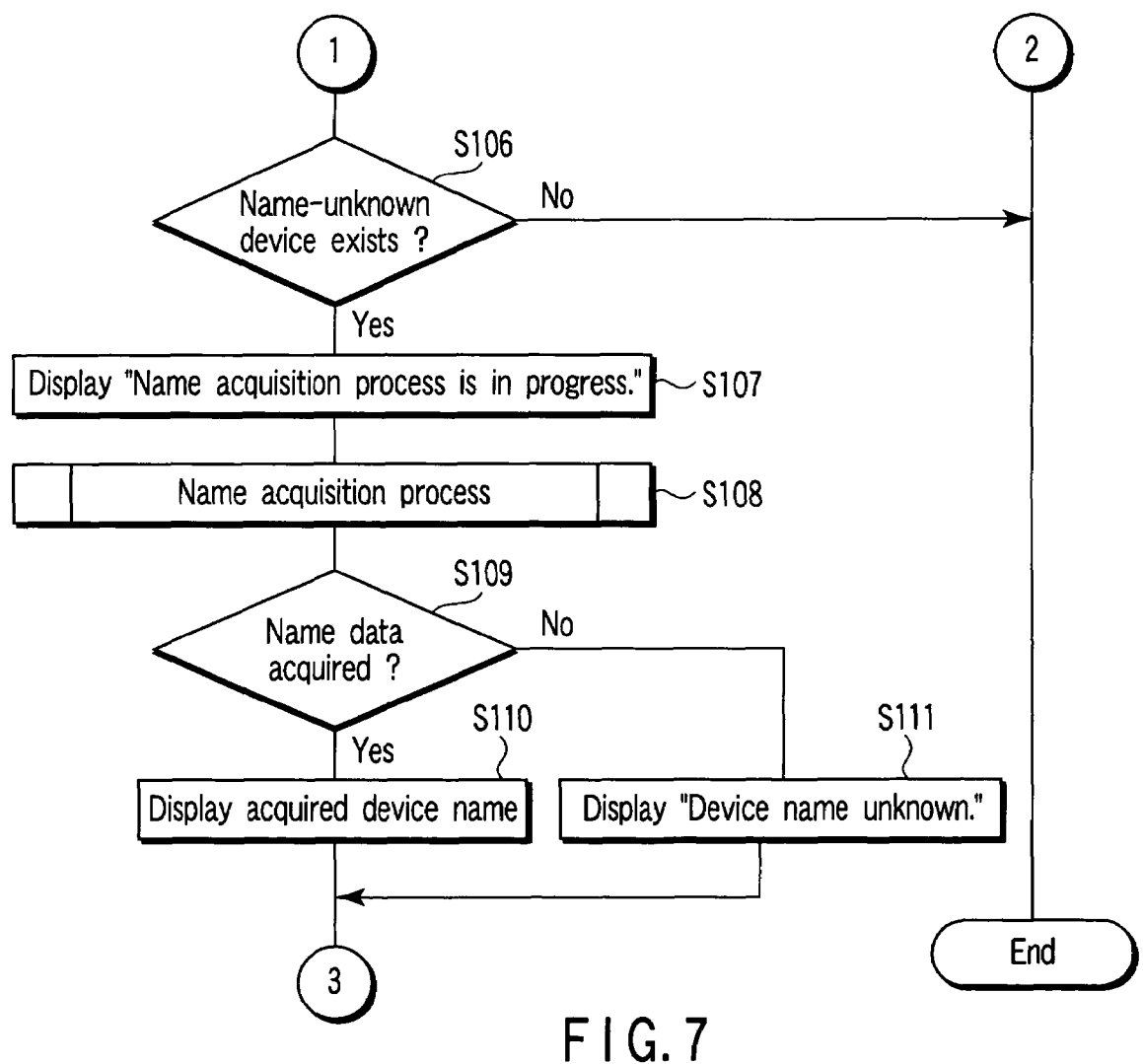
FIG. 7 is a flowchart showing processing procedures according to an embodiment of the invention.

If no device selection operation is done (NO in step S104 of FIG. 5) and no operation of canceling device selection is done (NO in step S105 of FIG. 5) while the remote device list 102 of the acquired device addresses is displayed on the display screen of the LCD 13, devices whose device names are unknown are subjected to a device name acquisition request (Name discovery) and an accompanying name acquisition process (steps S106 to S108 of FIG. 7). If device names (Device Name) can be acquired in the name acquisition process (YES in step S109 of FIG. 7), they are displayed in the remote device list 102 (step S110 of FIG. 7). If no device name (Device Name) can be acquired (NO in step S109 of FIG. 7), this state is displayed in the remote device list 102 (step S111 of FIG. 7). FIG. 4 shows display examples of the remote device list 102 as the list windows 402 to 405.

Since the remote device list 102 containing device names is displayed so that each device can be selected, the user can easily discriminate a device to be selected. At this time, the user does not perform any special operation. If the user performs device selection operation upon discriminating a device, he can advance to the next process (e.g., a connection request process) without any subsequent device name acquisition process.

Figure 8:
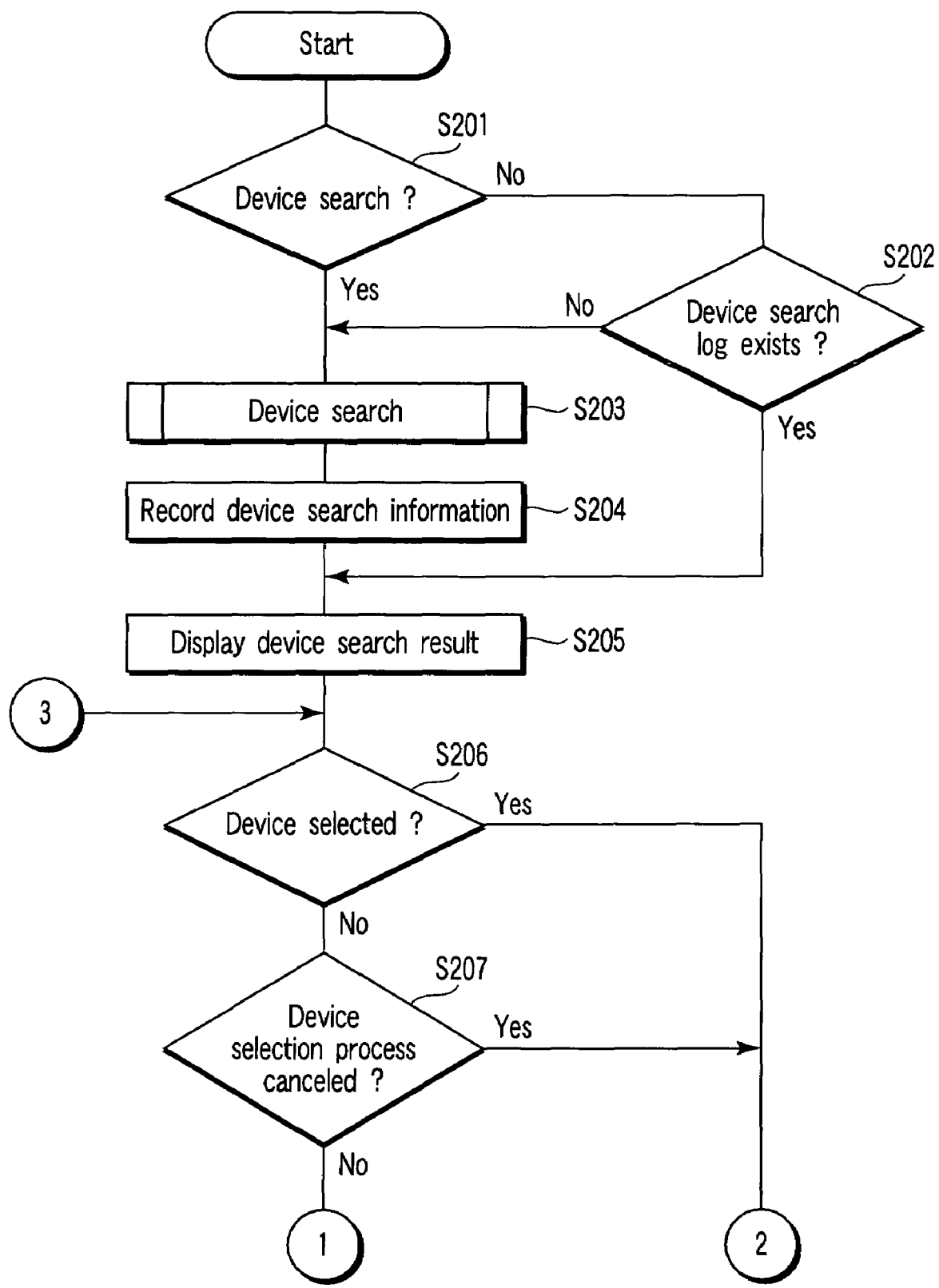
FIG. 8 is a flowchart showing processing procedures according to an embodiment of the invention.
Figure 9:
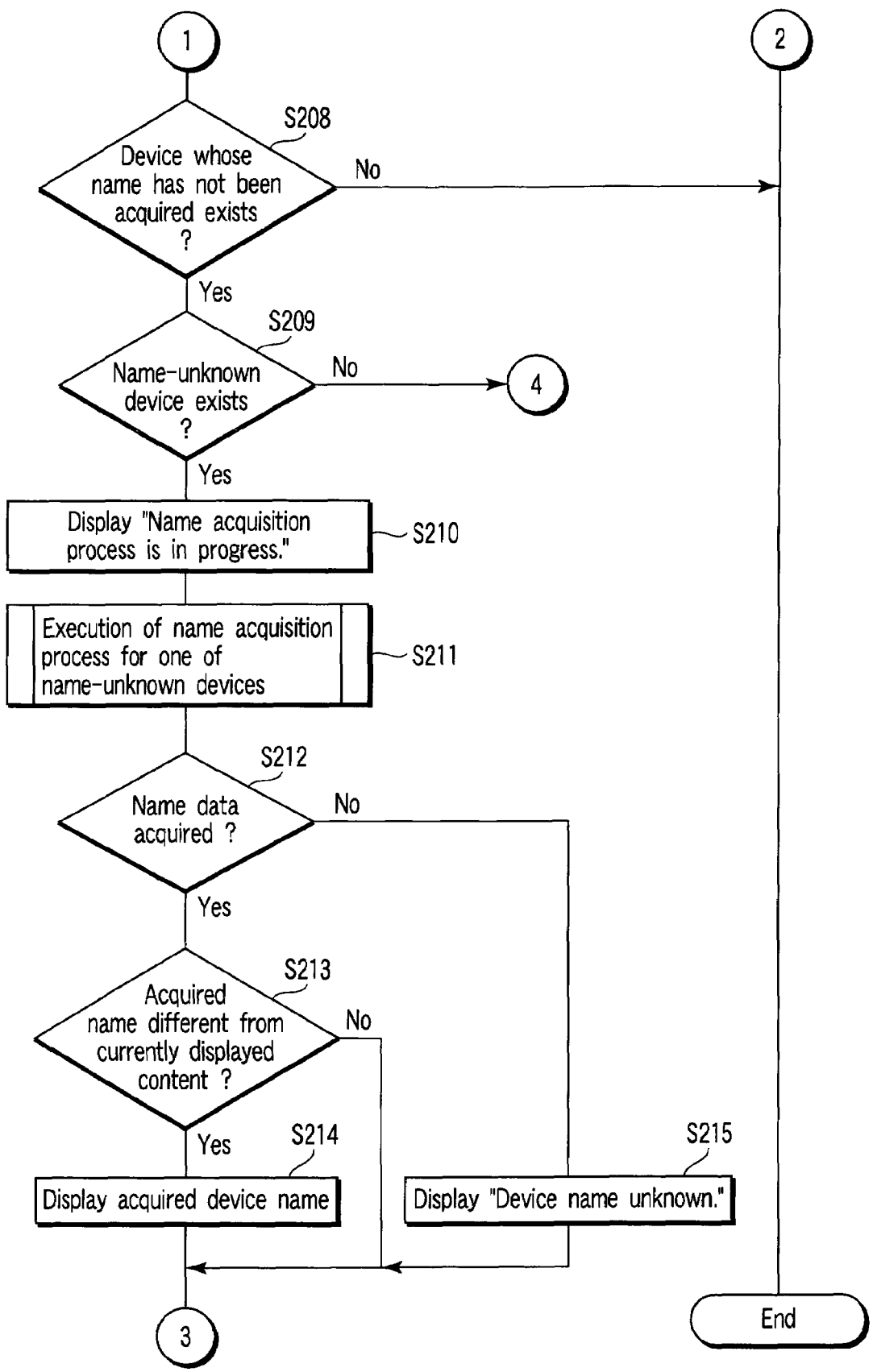
FIG. 9 is a flowchart showing processing procedures according to an embodiment of the invention.
Figure 10:
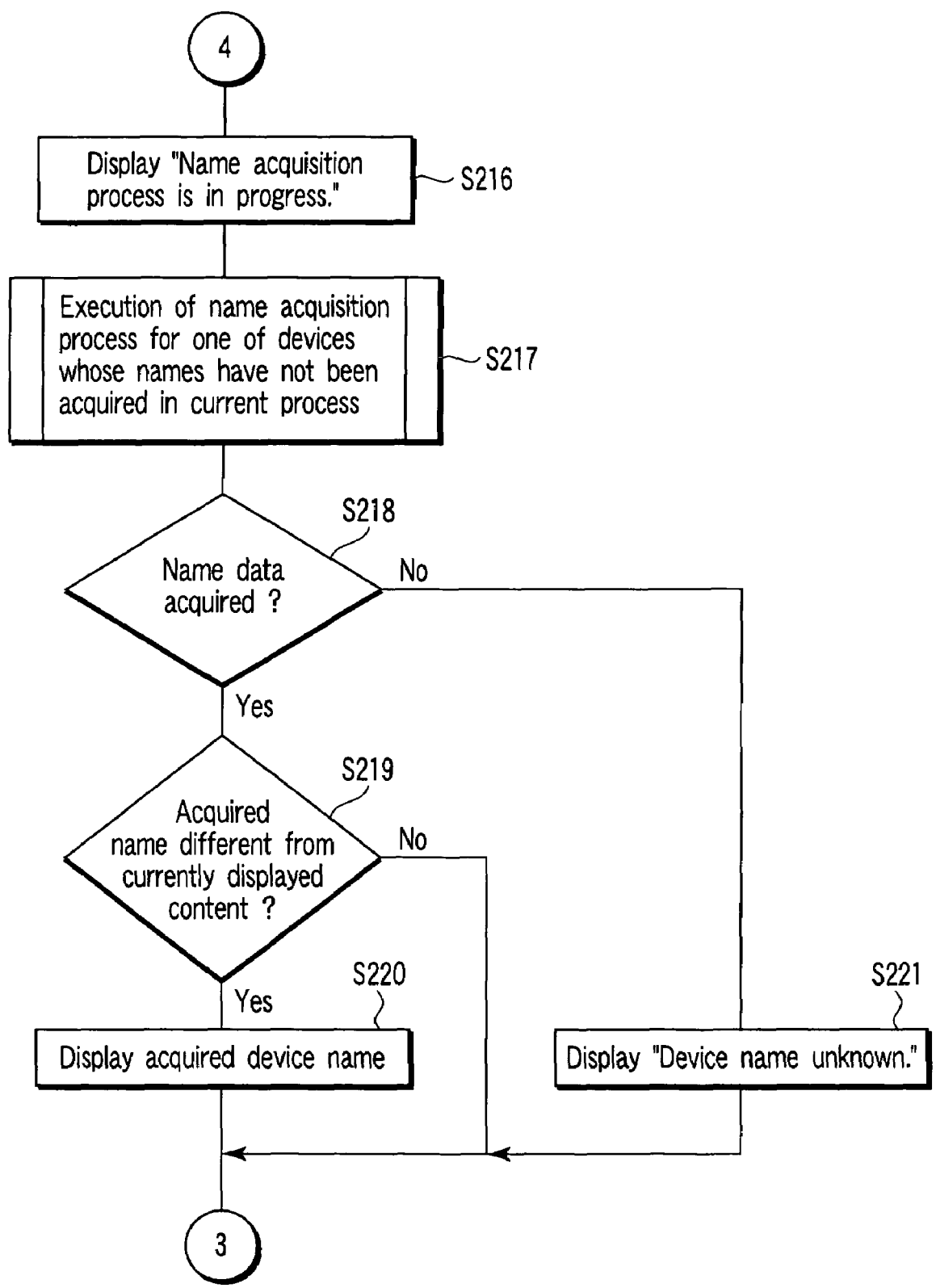
FIG. 10 is a flowchart showing processing procedures according to an embodiment of the invention.

FIGS. 8 to 10 show a process example when a device is selected by utilizing an acquired device name. In this example, all device names are acquired, considering that a device name can be changed by a partner device after the previous device name acquisition process.

In the device search process, whether to newly search for a device or select a device by utilizing an acquired device name in accordance with an instruction from the user is determined (step S201 of FIG. 8). If a device is to be newly searched for (YES in step S201 of FIG. 8), a station discovery request is transmitted, and an accompanying device search process is executed (steps S203 and S204 of FIG. 8). If a device is to be selected by utilizing an acquired device name (NO in step S201 of FIG. 8), whether the device search log exists is determined (step S202 of FIG. 8). If an acquired device name has been registered in the list together with the device address (YES in step S202 of FIG. 8), a station discovery request and an accompanying device search process (steps S203 and S204 of FIG. 8) are omitted. The remote device list 102 based on the registered list is displayed on the display screen of the LCD 13 (step S205 of FIG. 8).

If the user manipulates the pointing device 14 on the remote device list 102 to select, for example, the device address of a device to be communicated with (YES in step S206 of FIG. 8), the device search process ends. As the next process, for example, a connection request process, is performed for a device having the selected device address.

If an operation input such as "return" or "cancel" for canceling device selection is done instead of device selection operation (NO in step S206 and YES in step S207 of FIG. 8) while the remote device list 102 is displayed on the display screen of the LCD 13, the current device selection process ends.

If neither selection operation nor selection stop operation is performed on the remote device list 102 (NO in step S206 and NO in step S207 of FIG. 8), whether a device whose device name has not been acquired and a name-unknown device exists is verified (steps S208 and S209 of FIG. 9).

If a name-unknown device exists (YES in step S209 of FIG. 9), "under investigation" representing that the name acquisition process is in progress is displayed in the device name column of the device on the remote device list 102 (step S210 of FIG. 9), and the name acquisition process is executed for the device (step S211 of FIG. 9).

If the name can be acquired (YES in step S212 of FIG. 9), whether the acquired name coincides with the currently displayed name is verified (step S213 of FIG. 9).

If these names do not coincide with each other (YES in step S213 of FIG. 9), the newly acquired name is displayed in the corresponding column of the remote device list 102 (step S214 of FIG. 9).

If the acquired name coincides with the currently displayed name (NO in step S213 of FIG. 9), the displayed device name is kept displayed.

If no name can be acquired (NO in step S212 of FIG. 9), for example, "name unknown" representing this state is displayed in the corresponding column of the remote device list 102 (step S215 of FIG. 9). FIG. 4 shows display examples of the remote device list 102 as the list windows 406 to 408.

If a device whose name has not been acquired in the current device search process (step S203 of FIG. 8) though an acquired device name exists (YES in step S208 and NO in step S209 of FIG. 9), "under investigation" representing that the name acquisition process is in progress is displayed in the corresponding column of the remote device list 102 (step S216 of FIG. 10). The device then undergoes the name acquisition process (step S217 of FIG. 10).

If a new name can be acquired (YES in step S218 of FIG. 10), whether the acquired name coincides with the currently displayed name is verified (step S219 of FIG. 10).

If these names do not coincide with each other (YES in step S219 of FIG. 10), the newly acquired name is displayed in the corresponding column of the remote device list 102 (step S220 of FIG. 10).

If no name can be acquired (NO in step S218 of FIG. 10), for example, "name unknown" representing this state is displayed in the corresponding column of the remote device list 102 (step S221 of FIG. 10). The device name display process is executed until a device whose device name has not been acquired does not exist (NO in step S208 of FIG. 9). The process shown in FIG. 9 eliminates a name-unknown device as fast as possible by giving preference to name acquisition of a device whose device name has not been acquired yet. This allows the user to select a device as quickly as possible. The above-described process is executed for the searched devices. During any step of the process, a device can be selected from the remote device list 102.

In the display processes of device addresses and device names, an arbitrary name (registered name) which has been arbitrarily set and registered by the user can also be displayed in the remote device list 102 together with the acquired device names. In this case, a registered-name list which records an arbitrary name registered by the user in correspondence with the device address is prepared in the hard disk drive (HDD) 26. The registered-name list is referred to when the display processes of device addresses and device names are executed. Using the device address as a key, a desired registered name can also be displayed in the remote device list 102 together with the device addresses, acquired device names, and the like. More definite device selection can therefore be achieved for, e.g., the same device type by displaying the name registered by the user together with the device addresses, acquired device names, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus capable of executing wireless communication, comprising:
    a communication unit configured to transmit a station discovery request to remote devices capable of data transmission by wireless communication and to receive one or more device addresses corresponding to one or more remote devices that respond to the station discovery request;
    a display unit configured to display a list of the one or more device addresses corresponding to the one or more remote devices that respond to the station discovery request; and
    a processing unit configured to receive a selection from a user of a desired remote connection partner from among the one or more remote devices that respond to the station discovery request, the selection being made based solely on the list of the one or more device addresses, and, if a user selection is received, the processing unit being further configured to cause the communication unit to transmit a connection request to the selected remote connection partner before transmitting a name acquisition request to the selected remote connection partner, wherein the communication unit is adapted to transmit a device name acquisition request to one or more of the responsive devices if no connection partner is selected based upon the device addresses.

2. The electronic apparatus of claim 1, wherein the processing unit is adapted to display on the display unit a device name which corresponds to each displayed device address.

3. The electronic apparatus of claim 2, further comprising:
    an acquired-name management unit configured to store, display, and track changes to device names corresponding to received device addresses known from previous name acquisition operations.

4. The electronic apparatus of claim 3, further comprising a registered-name management unit configured to register names assigned by a user to devices having a communication function capable of responding to the station discovery request.

5. The electronic apparatus of claim 4, wherein the processing unit further acquires the registered name, and lists and displays the registered name with its corresponding device address.

6. The electronic apparatus of claim 5, wherein the processing unit lists and displays rows of corresponding device data, wherein the corresponding device data comprises:
    the addresses of the devices which respond to the station discovery request;
    the device names acquired by the device name acquisition request;
    the registered names acquired by the registered-name management unit; and
    acquisition states of the device names and the registered names.

7. The electronic apparatus of claim 1, wherein the communication unit and the remote devices communicate via a short-range wireless communication standard.

8. The electronic apparatus of claim 7, wherein the short-range wireless communication standard comprises the Bluetooth standard.

9. A method for executing wireless communication, comprising:
   transmitting a station discovery request to remote devices capable of data transmission by wireless communication;
   receiving device addresses of the remote devices which respond to the station discovery request;
   displaying a list of the one or more device addresses corresponding to the one or more remote devices that respond to the station discovery request;
   receiving a selection from a user of a desired remote connection partner from among the one or more remote devices that respond to the station discovery request, the selection being made based solely on the list of the one or more device addresses;
   transmitting, if a user selection is received, a connection request to the selected remote connection partner before transmitting a name acquisition request to the selected remote connection partner; and
   transmitting a device name acquisition request to the devices which respond to the station discovery request after listing and displaying the list of device addresses if no remote connection partner is selected based upon the device addresses.

10. The method of claim 9, further comprising:
    listing and displaying a list of device names acquired by the device name acquisition request, wherein each device name is listed with its corresponding device address.

11. The method of claim 10, further comprising:
    storing, displaying, and tracking changes to device names corresponding to received device addresses known from previous name acquisition operations.

12. The method of claim 11, further comprising registering names assigned by a user to devices having a communication function capable of responding to the station discovery request.

13. The method of claim 12, further comprising:
    acquiring the registered name; and
    listing and displaying the registered name with its corresponding device address.

14. The method of claim 13, further comprising listing and displaying rows of corresponding device data, wherein the corresponding device data comprises:
    the addresses of the devices which respond to the station discovery request;
    the device names acquired by the device name acquisition request;
    the registered names acquired by the registered-name management unit; and
    acquisition states of the device names and the registered names.

15. An electronic apparatus capable of executing wireless communication, comprising:
    means for transmitting a station discovery request to remote devices capable of data transmission by wireless communication;
    means for receiving a list of device addresses of the remote devices which respond to the station discovery request;
    means for displaying a list of the one or more device addresses corresponding to the one or more remote devices that respond to the station discovery request;
    means for receiving a selection from a user of a desired remote connection partner from among the one or more remote devices that respond to the station discovery request, the selection being made based solely on the list of the one or more device addresses;
    means for transmitting, if a user selection is received, a connection request to the selected remote connection partner before transmitting a name acquisition request to the selected remote connection partner; and
    means for transmitting a device name acquisition request to the devices which respond to the station discovery request after listing and displaying the list of device addresses if no remote connection partner is selected based upon the device addresses.

16. The method of claim 15, further comprising:
    means for listing and displaying a list of device names acquired by the device name acquisition request, wherein each device name is listed with its corresponding device address.

17. The apparatus of claim 16, further comprising:
    means for storing, displaying, and tracking changes to device names corresponding to received device addresses known from previous name acquisition operations.

18. The apparatus of claim 17, further comprising means for registering names assigned by a user to devices having a communication function capable of responding to the station discovery request.

19. The apparatus of claim 18, further comprising:
    means for acquiring the registered names; and
    means for listing and means for displaying the registered names with corresponding device addresses.

20. The apparatus of claim 19, further comprising means for listing and means for displaying rows of corresponding device data, wherein the corresponding device data comprises:
    the addresses of the devices which respond to the station discovery request;
    the device names acquired by the device name acquisition request;
    the registered names acquired by the registered-name management unit; and
    acquisition states of the device names and the registered names.

* * * * *